US009126321B2

(12) United States Patent
Muller et al.

(10) Patent No.: US 9,126,321 B2
(45) Date of Patent: Sep. 8, 2015

(54) MACHINE TOOL AND CONTROL PROCEDURE

(75) Inventors: Thomas Muller, Klosterlechfeld (DE); Germar Meiendres, Landsberg (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days.

(21) Appl. No.: 13/456,669

(22) Filed: Apr. 26, 2012

(65) Prior Publication Data

US 2012/0274254 A1 Nov. 1, 2012

(30) Foreign Application Priority Data

Apr. 27, 2011 (DE) ......................... 10 2011 017 579

(51) Int. Cl.

| | |
|---|---|
| ***G05D 23/00*** | (2006.01) |
| ***G05B 5/00*** | (2006.01) |
| ***H02P 1/06*** | (2006.01) |
| ***B25F 5/00*** | (2006.01) |
| ***B25D 11/12*** | (2006.01) |
| ***B25D 16/00*** | (2006.01) |

(52) U.S. Cl.

CPC ................ *B25F 5/00* (2013.01); *B25D 11/125* (2013.01); *B25D 16/00* (2013.01); *B25D 2216/0015* (2013.01); *B25D 2216/0023* (2013.01); *B25D 2216/0038* (2013.01); *B25D 2250/221* (2013.01)

(58) Field of Classification Search

USPC ................................ 340/407.2; 318/446, 430

See application file for complete search history.

(56) References Cited

U.S. PATENT DOCUMENTS

| | | | | |
|---|---|---|---|---|
| 6,424,799 | B1 | 7/2002 | Gilmore | |
| 2005/0136814 | A1 | 6/2005 | Rudolf et al. | |
| 2006/0081386 | A1* | 4/2006 | Zhang et al. | 173/2 |
| 2006/0124331 | A1* | 6/2006 | Stirm et al. | 173/178 |
| 2008/0277128 | A1* | 11/2008 | Satou | 173/48 |
| 2009/0101379 | A1* | 4/2009 | Du et al. | 173/176 |
| 2010/0313430 | A1* | 12/2010 | Yamaoka et al. | 30/276 |
| 2011/0088922 | A1* | 4/2011 | Hirayama et al. | 173/90 |
| 2012/0249313 | A1* | 10/2012 | Valfridsson et al. | 340/407.2 |
| 2013/0248217 | A1* | 9/2013 | Blum et al. | 173/205 |
| 2013/0333910 | A1* | 12/2013 | Tanimoto et al. | 173/176 |

FOREIGN PATENT DOCUMENTS

| | | | |
|---|---|---|---|
| EP | 1358969 | A2 | 11/2003 |
| WO | 2009102082 | A2 | 8/2009 |
| WO | WO 2011013852 | A1 * | 2/2011 |

OTHER PUBLICATIONS

European Search Report, Application No./Patent No. 12155287.1-1709 / 2517839, dated Jun. 11, 2013, 7 pages.

* cited by examiner

*Primary Examiner* — Paul Ip
*Assistant Examiner* — Devon Joseph
(74) *Attorney, Agent, or Firm* — McAndrews, Held & Malloy Ltd.

(57) ABSTRACT

A machine tool has a tool retainer for retaining a tool, a motor and a drivetrain which couples the motor with the tool retainer for transmitting a torque. A system pushbutton is coupled with a motor control. When the system pushbutton is activated by a user, the motor control controls the motor in such a way that the motor turns in a first sense of rotation for a duration and then in a sense of rotation opposed to the first sense of rotation. The duration is shorter than 100 ms.

13 Claims, 1 Drawing Sheet

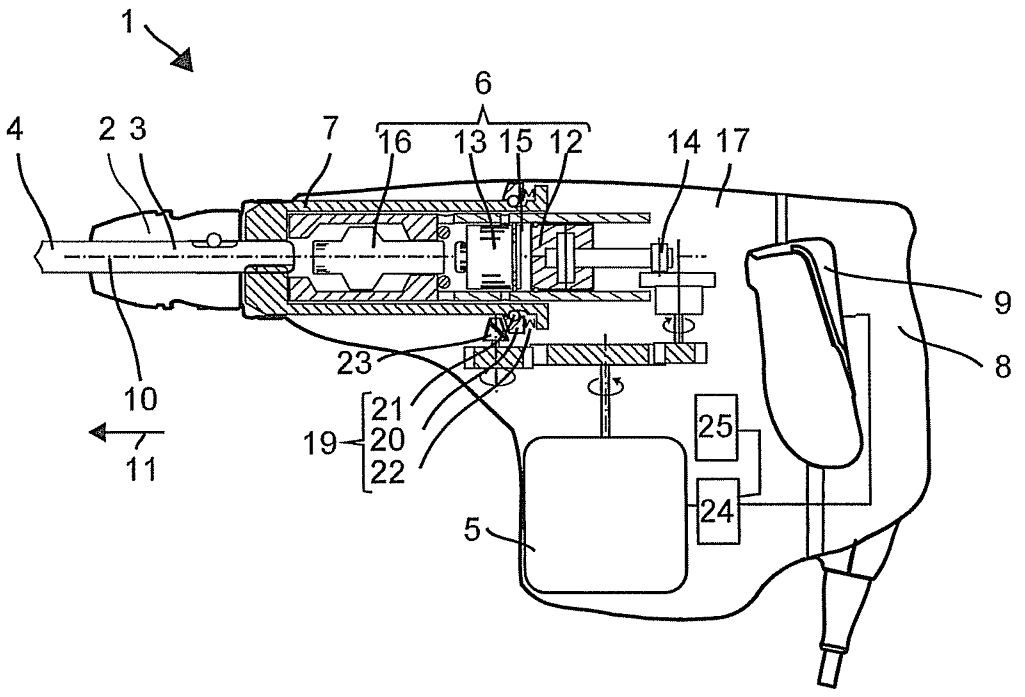
1
6
4
2 3
7
16
13 15 12
14 17
9
8
23
10
21
19
20
22
11
25
24
5

MACHINE TOOL AND CONTROL PROCEDURE

CROSS-REFERENCE TO RELATED APPLICATIONS

The present application claims priority to German Patent Application DE 10 2011 017 579.2, filed Apr. 27, 2011, and entitled "Werkzeugmaschine and Steuerungsverfahren" ("Machine Tool And Control Procedure"), which is hereby incorporated by reference in its entirety.

BACKGROUND OF THE INVENTION

The present invention relates to a machine tool, in particular a portable drilling machine tool such as a portable drill, hammer drill, etc. More specifically, the present invention relates to a control procedure for the machine tool, in particular a control procedure for turning on or activating the machine tool.

BRIEF SUMMARY OF THE INVENTION

One or more embodiments of the present invention provides a machine tool with a tool retainer for retaining a tool, a motor, and a drivetrain. The drivetrain couples the motor with the tool retainer for transmitting a torque. A system pushbutton is coupled with a motor control. When the system pushbutton is activated by a user, the motor control controls the motor in such a way that the motor turns in a first sense of rotation for a duration and then in a sense of rotation opposed to the first sense of rotation. The duration is preferably shorter than 100 ms.

BRIEF DESCRIPTION OF THE DRAWINGS

The description below explains the invention based on exemplary embodiments and figures. In the Figures:

FIG. 1 shows a manual machine tool.

DETAILED DESCRIPTION OF THE INVENTION

The machine tool according to one or more embodiments of the invention has a tool retainer to retain a tool, a motor and a drivetrain, which couples the motor with the tool retainer for transmitting a torque. A system pushbutton is coupled with a motor control. When the system pushbutton is activated by a user, the motor control controls the motor in such a way that the motor turns in a first sense of rotation for a duration and then in a sense of rotation opposed to the first sense of rotation. The duration is preferably shorter than 100 ms.

When a system pushbutton for starting a motor is activated, the control procedure for the machine tool according to one or more embodiments of the invention responds by turning the motor first in a first sense of rotation for a duration of less than 100 ms and then in a second sense of rotation opposed to the first sense of rotation. A tool is turned through the machine tool in a sense of rotation corresponding to its function when the motor is turning in the second sense of rotation.

FIG. 1 shows a schematic view of a hammer drill 1 as an example of a manual machine tool. The hammer drill 1 has a tool retainer 2, into which the end of a shaft 3 of a tool, e.g. a boring tool 4, may be inserted. A motor 5 driving a striking tool 6 and a hollow drive shaft 7 serves a primary drive of the hammer drill 1. A user may guide the hammer drill 1 using a handle 8 and operate the hammer drill 1 using the system pushbutton 9. While in operation, the hammer drill 1 continuously rotates the boring tool 4 around a working axis 10. In the process, it may drive the boring tool 4 into subsoil in the driving direction 11 along the working axis 10. In one embodiment, a selection switch to be operated by a user may be provided which allows the selection between at least two of the following modes: turning and driving, turning only and driving only.

The striking tool 6 is for instance a pneumatic striking tool 6. A driver unit 12 and a beater 13 are moveably arranged in the striking tool 6 alongside the working axis 10. The driver unit 12 is coupled to the motor 5 by way of a cam 14 or a gyratory finger and forced to perform a periodical linear motion. A pneumatic spring formed with a pneumatic chamber 15 between the driver unit 12 and the beater 13 couples one motion of the beater 13 to the motion of the driver unit 12. The beater 13 may hit directly onto a back end of the boring tool 4 or indirectly transmit part of its impulse onto the boring tool 4 through an essentially stationary interim beater 16. The striking tool 6 and preferably the other drive components are arranged within a machine case 17.

The drivetrain between the motor 5 and the hollow drive shaft 7 may contain a transmission 18 for adjusting a rotational speed of the motor 5 to a desired rotational speed of the tool 4. An overload coupler 19 may uncouple the motor 5 from the drive shaft 7 if a reverse power torque from the tool 4 exceeds a trigger-based torque of the overload coupler 19. An exemplary overload coupler 19 may comprise a hollow tapered gearwheel 20, which is axially moveably supported on the drive shaft 7 and torsionally rigidly catches into the drive shaft 7, e.g. by way of sphere 21. An axially acting spring 22 pushes the tapered gearwheel 20 into a contact area with a driving pinion 23 of the transmission. If the torque with reverse power torque exceeds a threshold value, the tapered gearwheel 20 is axially unlatched against the spring 22 and ends up outside the contact area of the driving pinion 23.

The motor 5 is preferably a brushless electric motor. A stator of the electric motor has a plurality of magnetized coils, which are traversed individually and independently from each other by current. One configuration of the motor 5 has three magnetized coils, which are offset from each other by 120 degrees around an axis of the motor. Sensors on the motor 5 may record an actual position of the angle of a rotor and transmit it to the motor control 24. The motor control 24 adjusts the amplitude of the current for each magnetized coil in response to the recorded angle position. For instance, two of the magnetized coils are traversed by current in an opposite sense of circulation, while a third one of the magnetized coils is currentless. Furthermore, the amplitude may be set or leveled depending on a desired rotational speed of the motor 5.

The system pushbutton 9 is coupled with the motor control 24. As soon as a user pushes the system pushbutton 9, the motor control 24 is activated. Preferably, the motor control 24 first determines a rotational speed of the motor 25. If the motor 25 is idle or the rotational speed falls short of a threshold value, a drive control is preferably activated. With the drive control, the motor 5 is first turned in an opposite sense of rotation as the one used for the hammer drill 1. Commercial quality drills only have a drilling effect with a specified sense of rotation, namely in clockwise direction relative to the drill bit. Furthermore, the conveying capacity of a helix is designed for said sense of rotation. The opposite sense of rotation of the motor 5 is characterized in that the drill 4 is turned counterclockwise. The motor 5 is turned in reverse direction for a short period of preferably less than 100 ms, or for example less than 50 ms or at least 10 ms, or as another example at least 20 ms. The duration is preferably selected as short that the tool 4 is not turned at all (or only minimally) due to the clearance associated with the transmission 18, the torque coupling 19 and other components of the drivetrain. The duration is preferably long enough that the clearance is put to the limit before the tool 4 starts turning.

The motor control 24 may turn the motor 5 in a reverse sense of rotation with reduced power consumption. Power consumption is preferably within the range of 10% to 50% of a rated power consumption of the motor 5. The amplitude of currents fed into the magnetized coils is limited by the motor control 24. The current may for instance be limited to a time-related average by way of pulse-width modulation. The torque transmitted by the motor 5 is reduced in accordance with the reduced power consumption relative to a maximum torque the motor 5 may transmit with the rated power consumption.

At the end of the duration, the motor control 24 activates the motor 5 according to the sense of rotation that is correct for using the hammer drill 1. Now, the motor 5 may accelerate in the correct sense of rotation, where no motion-related work is initially required for the tool 4 because of the clearance. This may be advantageous, especially if the tool 4 is stuck. The motor 5 is already accelerated to an angular momentum before it experiences an anti-torque moment because of the stuck tool 4. Furthermore, sufficient motor force may be freed by a torque-controlled pairing with a hammer drill 1. The motor force may be sufficient to unstick the stuck tool 4. The motor control 24 maintains the correct sense of rotation of the motor 5 for as long as the user is pushing the system pushbutton 9 and no blockage of the tool 4 occurs.

For the second sense of rotation, the motor control 24 increases the power consumption of the motor 5 to the rated power consumption to provide the user with a high torque for working with the machine tool.

If the user releases the system pushbutton 9, the motor control 24 stops driving the motor 5. In a first variant, the motor control 24 interrupts the current supply to all magnetized coils and as a result the motor 5 runs out. Other variants include active braking of the motor 5, for instance by way of short-circuiting the magnetized coils or by way of activating the magnetized coils in such a way that an anti-torque moment is created to slow down the motor 5 to the point of a standstill.

The hammer drill 1 may comprise sensor technology 25 to detect a rotational blockage of the tool 4. As soon as the sensor technology 25 identifies a blockage, the motor 5 is actively slowed down.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A control process for machine tool which includes a motor coupled to rotate a tool and a system pushbutton for controlling operation of the motor, comprising:

upon actuation of the pushbutton, initially rotating the motor in a first rotational direction that is opposite a functional direction of the tool for a predetermined duration of not more than 100 ms; and thereafter, if the pushbutton continues to be actuated, automatically turning the motor in a second rotational direction which is opposite the first rotational direction and corresponds to the tool's functional direction wherein the actuation of the system pushbutton defines a rotational speed of the motor and turning in the first sense of rotation only occurs if the motor is idle or the rotational speed is lower than a threshold value.

2. The control procedure of claim 1 wherein the motor is turned in the second rotational direction until either the user releases the system pushbutton or a sensor technology detects a blockage of the tool.

3. The control procedure of claim 1 wherein the motor is turned in the second sense of rotation until the user releases the system pushbutton.

4. The control procedure of claim 1 wherein the motor is turned in the second sense of rotation until a sensor technology detects a blockage of the tool.

5. The control procedure of claim 1 wherein a power consumption of the motor is limited to a level when it is turning in the first sense of rotation which is lower than 50% of the power consumption of the motor when it is turning in the second sense of rotation.

6. A machine tool comprising:

a tool retainer for retaining a tool;

a motor;

a drivetrain which couples the motor with the tool retainer for transmitting a torque;

a system pushbutton; and a motor control configured to control operation of the motor in response to actuation of the pushbutton, wherein, upon actuation of the pushbutton, the motor control (1) initially turns the motor for a predetermined duration in a first rotational direction which is opposite a functional direction of the tool, and (2) thereafter, if the pushbutton is still actuated, automatically rotates the motor in a second rotational direction which is opposite the first rotation direction and corresponds to the tool's functional direction wherein the actuation of the system pushbutton defines a rotational speed of the motor and turning in the first sense of rotation only occurs if the motor is idle or the rotational speed is lower than a threshold value.

7. A machine tool according to claim 6, wherein the predetermined time duration is less than 100 ms.

8. A machine tool according to claim 7, wherein the predetermined time duration is less than 50 ms.

9. A machine tool according to claim 7, wherein the predetermined time duration is at least 10 ms.

10. A machine tool according to claim 7, wherein the predetermined time duration is at least 20 ms.

11. The machine tool of claim 6, wherein the motor control continues turning the motor in the second rotational direction until the system pushbutton is released or a tool blockage is detected.

12. The machine tool of claim 6, wherein the predetermined duration is selected such that the tool is not rotated in the first direction due to a tolerance associated with drivetrain.

13. The machine tool of claim 6, wherein a power consumption of the motor is limited to a first level when turning in the first rotational direction, the first level being lower than 50% of a power consumption of the motor when turning in the second rotational direction.

* * * * *